(No Model.)
J. T. MORAN.
DRILL ROD COUPLING.
No. 573,433. Patented Dec. 15, 1896.
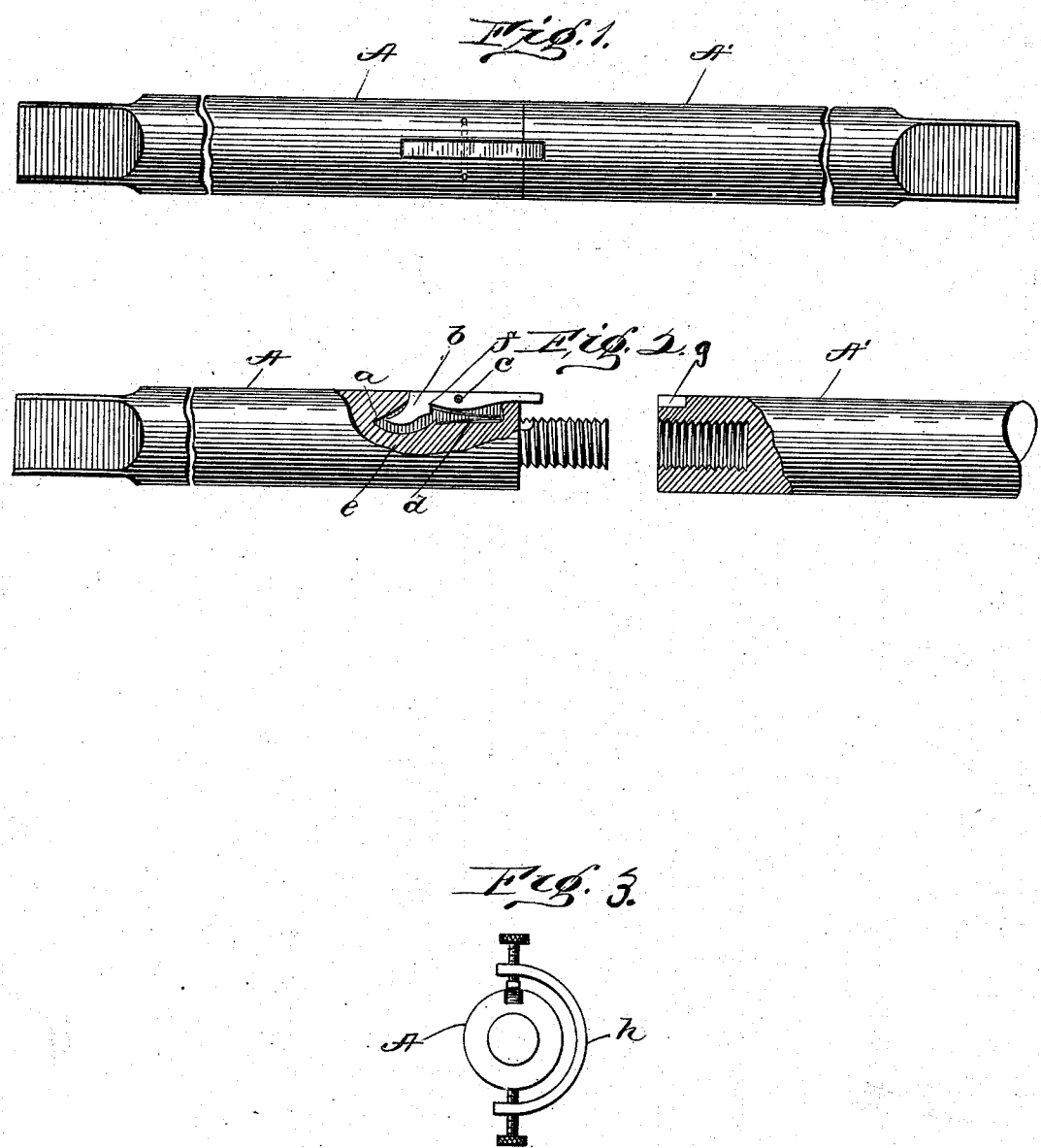

UNITED STATES PATENT OFFICE.

JAMES T. MORAN, OF ASHBURN, VIRGINIA, ASSIGNOR OF ONE-HALF TO EDWARD L. PLEASANTS.

DRILL-ROD COUPLING.

SPECIFICATION forming part of Letters Patent No. 573,433, dated December 15, 1896.

Application filed September 29, 1896. Serial No. 607,362. (No model.)

*To all whom it may concern:*

Be it known that I, JAMES T. MORAN, a citizen of the United States, residing at Ashburn, in the county of Loudoun and State of Virginia, have invented certain new and useful Improvements in Drill-Rod Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to produce a coupling for drill rods or shafts which will securely hold the two sections together and which will lie flush with the outer surface of the rod or shaft, so as not to interfere with its rotation.

Figure 1 is a plan view of my coupling. Fig. 2 is a side elevation with parts in broken section to illustrate the construction and relative arrangement of the parts. Fig. 3 is an end view of the rod or shaft and showing a spanner or tool which I may use in the operation of coupling the sections together.

In Figs. 1 and 2, A A' designate the sections of the drill-rod. Section A is recessed at $a$ to accommodate a spring bolt or dog $b$, pivoted at $c$ to the rod and having a spring $d$ for holding it in place. This spring may be conveniently formed from a strip of flat spring metal doubled upon itself and bearing at its ends against a projection on the rod at $e$, and a stop $f$ on the lower surface of the dog. The rear end of the dog projects downward and inward into the recess and serves as a stop to prevent it from being pushed out beyond the surface of the rod by the action of the spring. The front end of the dog projects beyond the shoulder at the base of the screw-thread and fits into a recess $g$ in the surface of section A'.

In coupling the two sections of the rod I make use of a spanner or yoke $h$, Fig. 3, having set-screws passing through its ends for bearing upon the rod and upon the dog back of its pivot, so as to throw the front end of the dog up beyond the surface of section A' while turning the sections to connect them at their threaded ends.

My coupling is reliable in use and may be manufactured at a small cost.

My device may be used as a shaft-coupling without change in construction or mode of operation.

What I desire to secure by Letters Patent and claim is—

A drill-rod coupling consisting of a dog, seated in a recess in one of the sections of a shaft, a rearwardly-projecting toe on the dog, a spring in the recess said spring bearing against a projection in the recess and a stop on the dog, a pivot for said dog, and a recess in the companion section, substantially as described.

In testimony whereof I affix my signature in presence of two witnesses.

JAMES T. MORAN.

Witnesses:
W. D. HEMPSTONE,
B. W. FRANKLIN.